(12) United States Patent
Hermus et al.

(10) Patent No.: US 9,710,208 B2
(45) Date of Patent: Jul. 18, 2017

(54) SYSTEM AND METHOD FOR VISUALIZING RELATIONSHIPS BETWEEN A SOURCE VIEW AND A TARGET VIEW

(71) Applicant: OCÉ-TECHNOLOGIES B.V., Venlo (NL)

(72) Inventors: Bastiaan J. Hermus, Venlo (NL); Nanne Krikke, Venlo (NL); Josephus A. M. Van Dun, Venlo (NL)

(73) Assignee: OCÉ-TECHNOLOGIES B.V., Venlo (NL)

( * ) Notice: Subject to any disclaimer, the term of this patent is extended or adjusted under 35 U.S.C. 154(b) by 0 days.

(21) Appl. No.: 15/088,240

(22) Filed: Apr. 1, 2016

(65) Prior Publication Data
US 2016/0291908 A1 Oct. 6, 2016

(30) Foreign Application Priority Data
Apr. 3, 2015 (EP) .................................... 15248007

(51) Int. Cl.
*G06F 3/12* (2006.01)

(52) U.S. Cl.
CPC ............ *G06F 3/1253* (2013.01); *G06F 3/121* (2013.01); *G06F 3/1204* (2013.01); *G06F 3/1207* (2013.01); *G06F 3/1229* (2013.01); *G06F 3/1248* (2013.01); *G06F 3/1259* (2013.01); *G06F 3/1292* (2013.01); *G06F 3/1293* (2013.01)

(58) Field of Classification Search
USPC ................................. 348/207.1, 208.2, 208.3
See application file for complete search history.

(56) References Cited

U.S. PATENT DOCUMENTS

| | | | | |
|---|---|---|---|---|
| 2007/0127053 | A1* | 6/2007 | Tominaga | G06F 3/121 358/1.14 |
| 2010/0309512 | A1* | 12/2010 | Onoda | G06F 3/0482 358/1.15 |
| 2012/0182432 | A1* | 7/2012 | Okamoto | G06F 3/1204 348/207.1 |

FOREIGN PATENT DOCUMENTS

EP    1 806 651 A2    7/2007

* cited by examiner

*Primary Examiner* — Henok A Shiferaw
(74) *Attorney, Agent, or Firm* — Birch, Stewart, Kolasch & Birch, LLP (57) ABSTRACT

A method for visualizing relationships between a source and target view includes displaying in the source view a source widget representing a source object; detecting a user interaction event for the source widget; sharing a message including a reference to or at least part of the source object; displaying in the target view a target widget representing a target object; reading by a target device that displays the target view the shared message; determining the existence of a relationship between the source and target object by looking-up in a storage the referenced or the at least part of the source object from the shared message; and updating the target view by changing the visual appearance if a relationship has been determined. The source and target object each are one of a printable object, a reprographic device or component thereof, and a property or status of any of the these.

20 Claims, 9 Drawing Sheets

SYSTEM AND METHOD FOR VISUALIZING RELATIONSHIPS BETWEEN A SOURCE VIEW AND A TARGET VIEW

FIELD OF THE INVENTION

The present invention generally pertains to techniques for visualizing relationships between different views displayed on multiple devices in a network.

BACKGROUND ART

The pattern of creating 'multiscreen systems' from multiple standalone electronic devices is emerging. Mobile electronic devices such as mobile tablets, smart phones, portable and wearable computers or the like can be used as a paired display and/or a control panel for other networked electronic devices.

Known multi-device multi-screen applications range from media sharing, remote command and control or simple standalone cooperating applications where a target device having a display is arranged to execute an action upon reading a message shared by a source device. For clarity, a user having a source device networked with a target device interacts with the user interface of said source device that is arranged to share a message with the target device and where upon receiving said message the target device executes an action with effects on the target device that, as a consequence, updates the user interface of the target device.

For example, a user has a source device such as a smartphone arranged with a print submitter application showing a user interface on the smartphone display. The application may be arranged to submit upon user interaction a print job or document with settings by means of a message with details about said print job or document to a printer device that, upon receiving the details will print automatically said print job or document with the settings.

The problem perceived by the user willing to interact with a target device using a source device is that, although he has visual access to both the source and the target displays he can hardly deduce beforehand what are the effects on the target device of the user interaction performed on the source device. Interpreting these effects in advance requires cognitive effort since users need to mentally match the information shown on the display of the target device to his interaction on the screen of the source device. Further, when the user interface displayed on the target device is too complex or incomplete the user may have difficulties in identifying the relations or may be unable to identify them. Further, in case said effects have consequent undesired results users need to know about said effects in advance before interacting with the source device so that the effects on the target device can be avoided.

In a first example, a user willing to print a large print job with hundreds of documents having specific print settings would like to know in advance which documents cannot be printed due to various reasons such as missing media type or size, insufficient ink or due to other conditions that may not be met. Although the user has access to the printer display panel he will have to perform an educated guess requiring a high cognitive effort about potential printing problems specific to his current intent that is printing the print job. Further, although the ink level and loaded media type and size may be shown on the printer display panel the user may be unable to mentally infer printing problems.

In a second example, a user inspecting a print queue shown on a printer display may have difficulties in identifying his jobs especially when the jobs list is long and comprise jobs from other users or, when the information shown is hard to interpret as such.

Hence, what is needed is a mechanism that will aid the user in combining the information shown on a display of a source device with the information shown on a display of a target device.

Some attempts of techniques relating to multi-screen systems made of standalone devices having displays are focusing on solving the problem of collaborative interactive work between two users having different devices showing the same or similar user interface. Thus, although said attempts concern the same kind of systems, the problem to solve and solution are different.

Some other attempts of techniques relating to a user observing multi-screen device are focusing on solving the problem of showing alternative views with different details. Although these techniques focus on the needs of a user viewing a multi-screen system, the system is not constituted of multiple devices and the problem as well as the solution are different.

It is an object of the present invention to provide an automatic method, a system and a target device arranged for helping a user to visualize relationships between a source view displayed on a display of a source device and a target view displayed on a display of a target device and, by doing so, to simplify the cognitive effort of a user of the source and target device.

SUMMARY OF THE INVENTION

According to a first aspect of the present invention, an automatic method is provided for visualizing contextual relationships in a networked system comprising a source device having a source display and a target device having a target display, the method comprises a step of displaying on the source display a source view comprising a source widget representing a source object, a step of detecting a user interface event with regard to the source widget, a step of sharing a message upon detecting said user interaction event, a step of displaying on the target display a target view comprising a target widget representing a target object, a step of reading the shared message by the target device, a step of determining whether the target view and/or the target widget are contextually related to the source object, and a step of updating the target view and/or the target widget by changing the visual appearance of said target widget or adding a new overlaid widget if a relationship has been determined, wherein the source and the target objects are a printable object, a reprographic device, or a component thereof, or a property or a status of the previously mentioned, and where said message comprises a reference to or at least part of said source object, and where the target view is different from the source view, and where the target object is different from the source object, and where the determining step determines if there is a contextual relationship between the target object and the reference or the at least part of said source object from the shared message by looking up in a storage a relation between the two and evaluating a determining predicate.

In an embodiment of the present invention, the source and target devices are electronic computing devices having memory means for storing data and/or code for random access, nonvolatile storage means for persisting data and/or code, processing means for executing a state machine according to a code and input events, a display for showing a user interface, user interaction means for capturing user interaction events, interfacing means for interacting with external devices and the environment, and internal communication means for linking the above mentioned means, where said memory means are random access memories or the like, and where the nonvolatile storage means are hard disks, optical disks, solid state disks or other persistent means that are capable to preserve data even when unpowered by an energy source, and where said processing means are central processing units, programmable logic devices or other dedicated very large scale integrated logic circuits, and where said user interaction means are touchscreen sensors, pointing devices such as a mouse, a touch pad, a stick, navigation buttons, jog dial controls, accelerometer or optical based movement and gesture sensing devices or sensors, audio sensing devices for sound and/or voice detection or the like, and where said interfacing means are among other interfacing means networking means arranged to communicate with a different device using a wired or wireless network such as Ethernet, WiFi, Bluetooth, ANT+, infra-red, RFID or cellular data such as 2G, 3G, LTE, WiMAX or the like, and where said internal communication means comprise a communication bus having a connection topology linking the the memory means, the nonvolatile storage means, the processing means, the display, the user interaction means, the interfacing means including the network means and allowing them to exchange data and synchronize their functions.

In a preferred embodiment of the present invention, at least one of the source and target devices is a mobile computing device such as a smartphone, a mobile tablet, a slate, a PDA, a laptop, a smart wristwatch, a mobile media player or any other mobile device that can be brought in the visual vicinity of another device.

In a preferred embodiment of the present invention, one of the source and the target devices is a reprographic device such as a printer, a scanner, a standalone printer controller or printing server, a finisher such as a cutter, a folder, a stacker or the like.

In some embodiments, the source and the target device will communicate directly while in others the communication will be indirect using a broker or persistent repository such as a network database. For example, in a direct communication embodiment the source device will send a message directly to the address of the target device or will broadcast or multicast a message that will be received and handled by the target device. Also for example, in an indirect communication embodiment the source device will write a message in a database or will publish a message on a shared queue and the target device will read or be notified and then receive or read the shared message from the subscribed queue or database. Other communication embodiments are possible and expected as long as the message shared by the source device using the network means will be read by the target device.

In a preferred embodiment, the source and target device will be networked in the same time although in other possible embodiments the connection to the network may be ephemeral and disparate in time.

In some embodiments, the display of the source and target devices will show a source view and a different target view representing the user interfaces of said source and target devices, and where said views comprise source and target widgets representing source and target objects available or accessible on the source and target device. It shall be noted that although some preferred display embodiments will show a view only when powered, other possible and expected embodiments such as e-ink devices will display a persistent view even when power to the display has been removed.

In a preferred embodiment, the representation and behavior of said user interface is preferably implemented by a software application running as code and data on said source and target devices.

In an expected embodiment, the source or the target objects are a document, a print job or properties thereof expressed using a print job or document description language and may include for example the document names and types, the number of copies, the printing color intent, the print quality mode, impositioning parameters, cropping parameters and the like. The above mentioned list shall not be considered as limitative to the scope of the present invention and shall be interpreted as a mere example. The actual lists of possible documents, print jobs and properties thereof shall be obvious to a person skilled in the art of print document and print job description languages and shall be considered in the scope of the present invention as possible embodiments.

In a further expected embodiment, the source or the target objects are a reprographic device or components thereof having properties including but not limited to media trays, ink cartridges, output trays, print heads, stacker units, folder units, finishing units or other print path zones and components having properties and state. For clarity, the above mentioned list shall not be considered as limitative to the scope of the present invention but shall be interpreted as a mere example. The list of reprographic devices and components thereof as well as their properties shall be obvious to a person skilled in the art of reprographics and printing and are considered in the scope of the present invention as possible embodiments.

In an expected embodiment, the user interaction means are monitored by a software application program executing code on the source device that generates user interaction events to be handled by handler modules based on said user interaction events and the current application state represented as data.

In an expected embodiment, the user interaction events are preparatory and do not trigger permanent actions. For clarity and by way of example, such events comprise selection, deselection, focus, unfocus, hover over or any other user interface events targeting one or a group of multiple source widgets and that are preparative to committing a transaction action with permanent effects. For further clarity and by way of example, an event such as pressing a button and launching the printing of a print job that cannot be undone and that represents a commit of a transaction cannot be considered in the scope. It shall be further understood that such user interaction events can be simple or composed of several elementary events as for example multi-selecting several widgets representing documents in a list.

In an expected embodiment, said user interaction events are triggering and used as input by a handler that, based on the event and the current state of the source device, will further consider whether or not to share a message using the interfacing means and in particular the networking means.

In a preferred embodiment, the sharing means of the source device will share to a network a message comprising a reference to or at least part of the source object represented by the source widget with which the user interacted. For clarity, in case the interaction relates to multiple widgets representing objects the shared message will comprise a reference to or at least part of at least one or more of these objects. For further clarity, the message sharing will use the interfacing means and particularly the networking means for sharing the message to a connected network.

In a preferred embodiment of the target device, reading means will access a network using the network means and read or receive the shared message. By way of example, a target device may use for reading the message a network access card connected to a network such as WiFi and using a communication protocol stack such as TCP/IP and a reading module such as an application process loaded in memory and executed by the processor for reading and notifying the determining means. By way of example, the reading means can employ various reading strategies including but not limited to polling or monitoring a shared resource on the network such as a database, a shared file system or it may actively listen for unicast, broadcast and/or multicast notifications. It shall be noted that, the reading means specifics may be different than the mentioned ones and, therefore they shall be interpreted as mere examples and not as specific limitations.

In an expected embodiment, the determining means will look-up the reference to or the at least part of the source object read from the message and search for relationships between the source object and a target object represented as a widget on the target view shown on the target display. For a first example, when a message comprises a reference to a print job having documents then the determining means may find a relationship between a document media type and size specified in the print job and a printer tray of the printer, being the target device, that holds the specified media type and size. For a second example, the shared message comprises the identity of a user interacting with a mobile tablet that is the source device. The printer, that is the target device, may look-up up upon reading the message the print jobs sent by the user in the jobs list print queue and highlights them on the target device display. For a third example, when a message comprising print job properties is read by the target device then the determining means may look-up if all documents and print properties are valid and can be used for printing as such. It shall be noted that, in general, when receiving any message that is read by the target device reading means, the determining means will apply inference rules and search for relationships with the currently displayed widgets on the target view shown on the target display. Such rules are expected to look-up for related widgets based on the configuration of the target device and on the message read. It is expected that the determining step will provide alternative determining heuristics based on the configuration and the state of the target device as well as on the message read.

In an expected embodiment, upon determining a relationship by the determining means the determined target widgets or the target view may be highlighted or graphically adorned with new overlaid widgets. As such, it is expected to have a visual update for a target widget and/or the target view, if there is a relationship between a target object represented by a currently displayed target widget on the one hand, and the message and thus a source object represented by a source widget at the other hand. For example, when the determining means determine that a print job from the printing queue cannot be printed then several updates may be performed such as highlighting the print job using a different border or text color as well as listing as new adornment widgets the document details of the documents from the job that cannot be printed. It shall be understood that such updates are intended to help the user find contextual relationships between the target view and the target widgets on the one hand and with the source view and source widgets on the other hand and to help him perform a workflow action with a better productivity and with a better understanding of the system. Further scope of applicability of the present invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying schematic drawings which are given by way of illustration only, and thus are not limitative of the present invention, and wherein.

DETAILED DESCRIPTION OF THE DRAWINGS

The detailed description is presented for the purpose of allowing any person skilled in the art to make and use embodiments of the herein disclosed method, system and target device.

It shall be understood that, although the detailed description and drawings are provided by way of example and in the context of a particular embodiment, other embodiments and variations preserving the scope of the invention are possible and will be apparent to those skilled in the art.

The present invention will now be described with reference to the accompanying drawings, wherein the same reference numerals have been used to identify the same elements throughout the several views.

Figure 1:
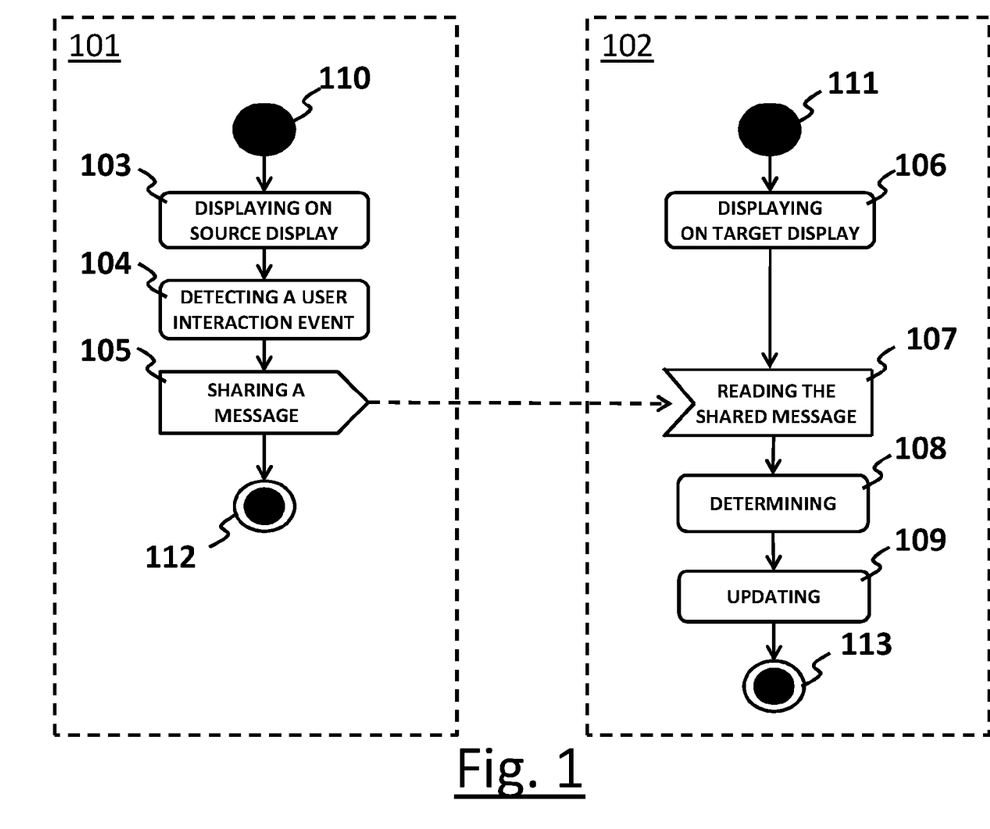
FIG. 1 shows a UML activity diagram of a method flow having method steps.

FIG. 1 shows using an UML activity diagram the method flow having steps according to the invention. A source device 101 and a target device 102 are required for executing the method steps 103 to 109. The source device 101 and the target device 102 are networked so that a message can be shared.

According to FIG. 1, the precedence and concurrence of the method steps is determined by the oriented arrows indicating the flow. The precedence of the method steps on each of the devices 101 and 102 is sequential and determined locally with the exception of the step of sharing a message 105 by the source device 101 that precedes the step of reading the shared message 107 by the target device 102. Therefore, each of the two devices 101 and 102 has its own flow that is executed concurrently and independently from the other with the exception of said precedence. By way of example, the method flow on the source device 101 starts from an initial state 110 with a step of displaying 103 on the source display followed by a step of detecting 104 a user interaction event followed by a step of sharing 105 a message and ending in a final state 112. Similarly, by way of example, the method flow on the target device 102 starts from an initial state 111 with the step of displaying 106 on the target display followed by the step of reading 107 the shared message followed by a step of determining 108 followed by a step of updating 109 and ending in a final state 113. It shall be understood that the step of displaying 106 on the target device is not correlated with any of the method steps of the source device 101 and can be performed even after the step of sharing 105 a message. For clarity, in a possible embodiment a source device 101 may be performing the step of displaying 103 on source display by showing the user interface of a running application while in the same time the target device 102 may be in the initial step 111 saving power and having the display turned off.

Figure 2:
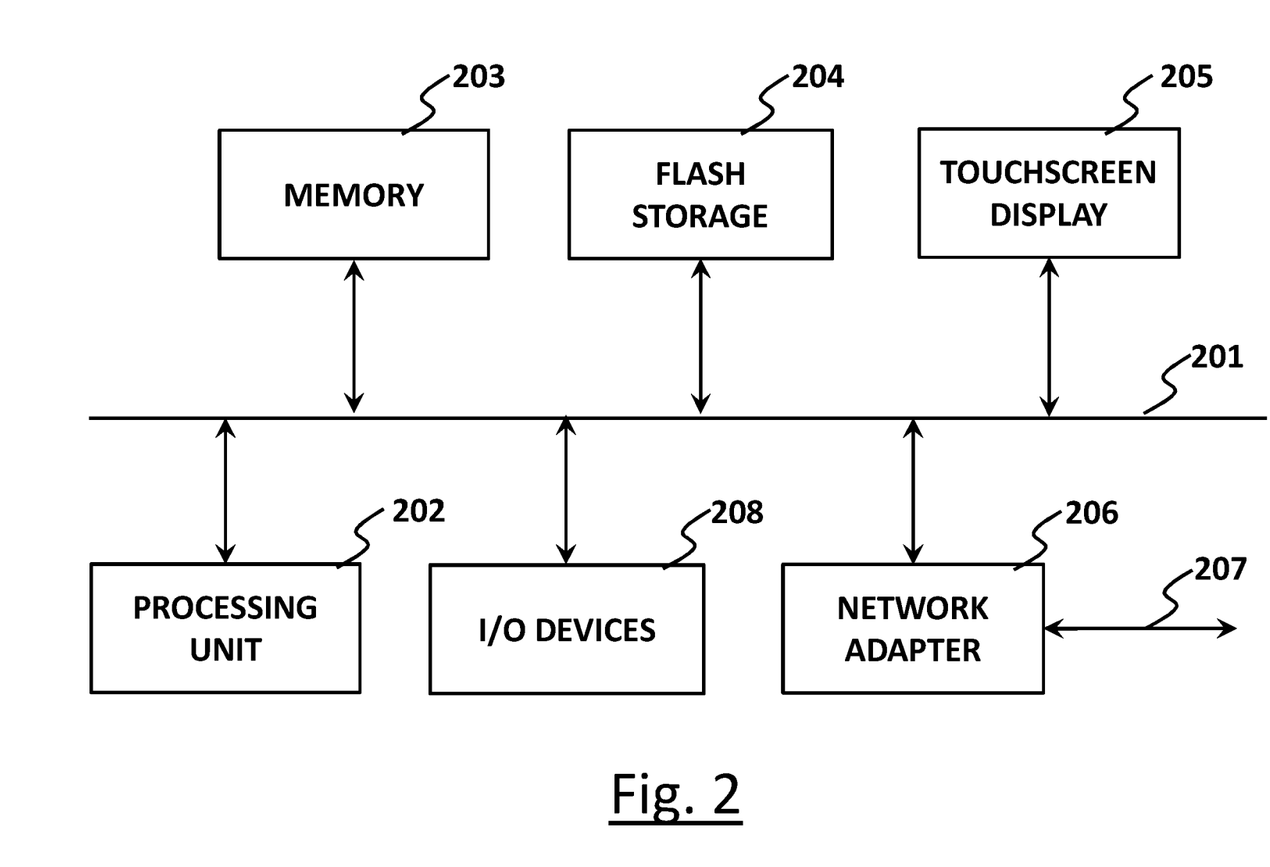
FIG. 2 illustrates a component diagram of an embodiment of a source device that is a mobile device.

FIG. 2 shows a first embodiment of a source device 101 or of a target device 102 mentioned in FIG. 1 that is a mobile tablet, a slate or a smartphone comprising a bus 201 interconnecting the following modules: a processing unit 202, a memory 203, a flash storage 204, a touch screen display 205, other input/output devices 208 and a network adapter 206 providing access to a network 207.

According to FIG. 2, in the presented embodiment data structures and/or code describing the behavior of the method steps are persistently stored on the flash storage 204 using a computer readable representation and, when the source device 101 is powered then said data structures and/or code are loaded on demand by the processing unit 202 into the memory 203 for further access and execution. Upon execution, the touchscreen display 205 displays a user interface and is arranged to receive user interaction.

Further according to FIG. 2, several alternative implementation embodiments can be used for the bus 201, the processing unit 202, the memory 203, the flash storage 204, the touchscreen display 205, the input/output devices 208, the network adapter 206 and the network 207. By way of example, in some possible embodiments the memory 203 may be a RAM such as DRAM or SRAM. In other embodiments the memory 203 and the flash storage 204 may be implemented by means of a common technology such as MRAM that provide both fast random access and persistence. Further, in some embodiments the touchscreen display 205 may be split into a normal display and other means for user interaction such as pointing devices and/or buttons that are specialized input/output devices 208. Further, in some embodiments the network adapter 206 may be a data modem having access to a cellular line network 207 such as GSM, 2G, 3G, WIMAX or it may be a WIFI network card having access to network 207 that is a wireless network or the like. Further, in some embodiments the processing unit 202 may be a CPU implementing a well-known CPU architecture and instruction set while in others it may be a programmable logic device or specialized ASIC having at least part of said method steps embedded directly into its logic and thus eliminating the need for the flash storage 204 or for another persistent storage.

Figure 3:
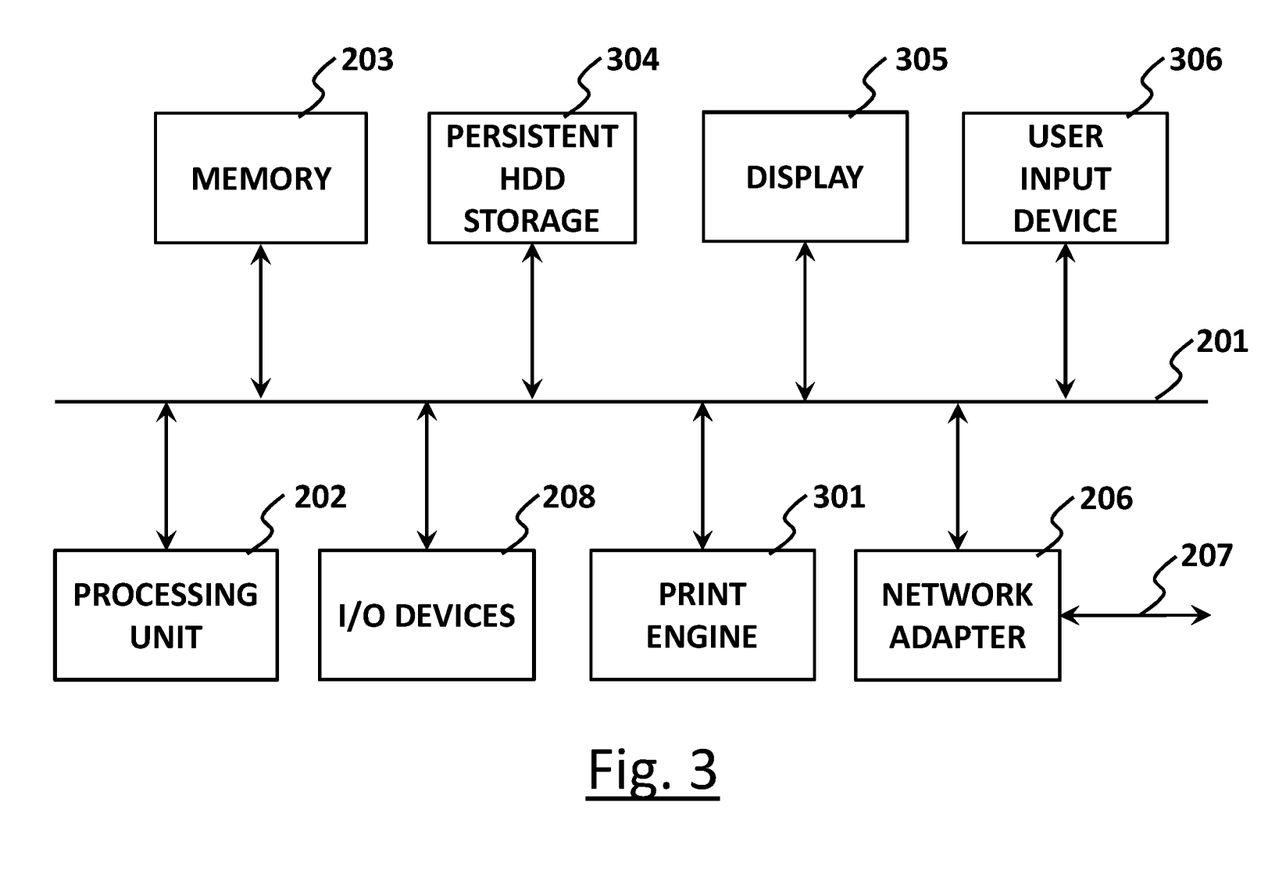
FIG. 3 shows a component diagram of an embodiment of a target device that is a printer.

FIG. 3 shows a second embodiment of a source device 101 or of a target device 102 mentioned in FIG. 2 that is a printer controller. Compared to the first embodiment shown in FIG. 2 a print engine 301 is embedded in the printer controller with the purpose of commanding and controlling various physical subassemblies such as the media path and the print heads of the printer. By way of example, the flash storage 204 mentioned in FIG. 2 is substituted by a higher capacity persistent HDD storage 304 and the touchscreen display 205 shown in FIG. 2 is replaced by a printer display 305 and a separate user input device 306 that is a control panel. Other parts comprising the bus 201, memory 203, the processing unit 202, the input/output devices, the network adapter 206 and network 207 preserve their function although the implementation may be different.

For clarity, it shall be understood that any implementation variations and combinations of the parts presented in FIG. 2 and FIG. 3, such as the above mentioned ones, are not limitative to the scope of the present invention but are given as examples.

Figure 4:
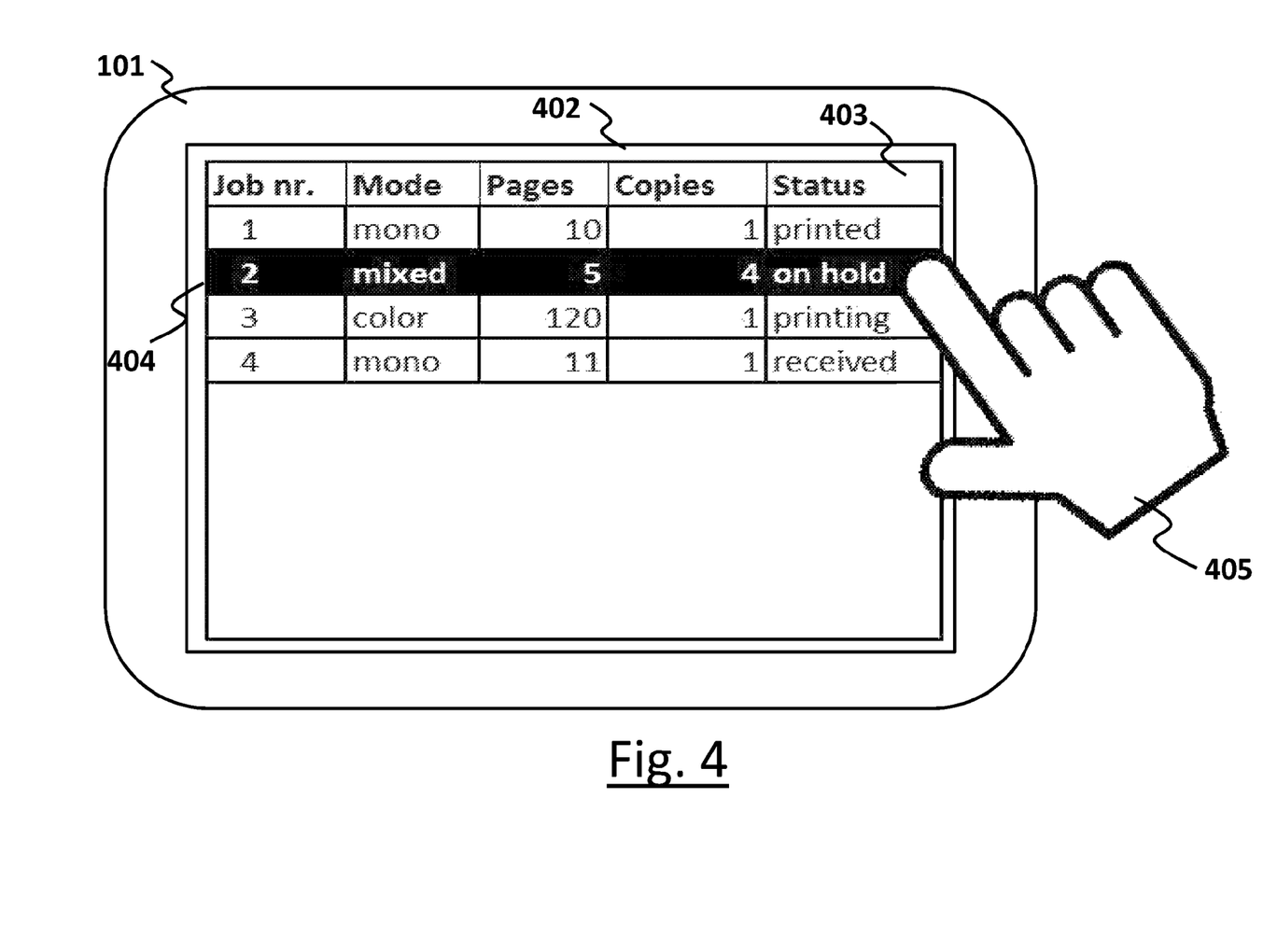
FIG. 4 illustrates an embodiment of a user interaction with a printing application displayed on a touchscreen display of a source device.

FIG. 4 illustrates an embodiment of a touchscreen display 402 of a source device 101, the touchscreen display 402 showing a source view 403 comprising graphical widgets representing print jobs details, by way of example, a job details widget 404 showing properties and status of a print job. For clarity, in a typical embodiment said method step of displaying on the source view 103 from FIG. 1 is part of a printing software application for submitting print jobs from a mobile device to a printer and that, when executed displays the source view 403 on the touchscreen display 402 and where said widget 404 represents a source object that is in this particular case a print job that has been submitted to a printer.

Further, according to the embodiment shown in FIG. 4, when a user 405 interacts with the touchscreen 402 targeting the widget 404 than, according to the step of detecting a user interaction event 104 shown in FIG. 1, a user interaction event is detected by the touchscreen 403 and routed for processing to a handler listening for user interaction events related to the source view widgets and in this particular case to the widget 404. Further, as a result of handling said user interaction event, the handler interprets the event as a selection event and infers from the event and from the source object represented by the widget 404 a message comprising a reference to or at least part of the source object, in this particular case a print job. Therefore, in this particular embodiment the detection involves both the touchscreen 402 hardware that is arranged for sensing user interaction events and the handler that processes said events and generates messages comprising a reference or at least part of said source objects. In this particular case the selection event generated by the user 405 on the widget 404 representing the details of a print job object is sensed by the touchscreen display 402 then further processed by a handler running in the device 101. For clarity, it shall be noted that although in a typical embodiment the handler will be a software module loaded into the memory means as code and data and executed by the processing means this does not constitute the only possible implementation and is a mere example.

For further clarity, although the embodiment of FIG. 4 shows a view comprising a list of print jobs, other embodiments will appear natural to a person skilled in the art of printing applications. For example, although the embodiment of FIG. 4 references a touch event performed by a user 405 on a widget 404 where the touch event is detected by the touchscreen display 403 it shall be understand that other user interaction means as well as other user interaction event types such as selecting, deselecting, multi selecting, hovering over, focus change or the like are possible and fall within the scope of the present invention as long as these events do not trigger further workflow actions and are not used for replacing the current view 403 by a new one. For clarity and by way of example, when considering FIG. 4 and a different embodiment where the device 101 is arranged for starting printing the print job represented by the widget 404 when the user 405 touches the widget then although the event is a touch user interaction event it shall not be considered in the scope of the present invention as it is interpreted as an action launching the printing of the job and having permanent results that cannot be undone.

Further according to FIG. 4, it shall be noted that although the user interaction event shown in FIG. 4 is an elementary one as it is related to one source widget representing one source object, in general, the user interaction events may be compound. For example, the user 405 may continue selecting multiple jobs either by hovering over or touching repeatedly the listed widgets.

With regard to one aspect of the present invention and according to FIG. 4, it shall be noted that although the shown embodiment considers a selection event of the widget 404 other events such as de-selection, hover over, multiple selection and deselection or any other user interaction event that does not have a commit like transactional behavior implying actions or changes in the system that cannot be undone are valid and considered in the scope of the present invention.

According to another aspect of the present invention, although FIG. 4 shows a user 405 interacting with a source device 101, the device 101 may play also the role of a target device that reacts and updates its display view upon reading a message. The role of the device is determined by the fact that the user 405 interacts with it by means of a user interaction event generating a message. Therefore, two devices may play concomitantly or exchange their roles in time alternatively, the source device 101 being the one that senses the current user interaction events and the target device being the one that updates the user interface upon reading a shared message by the source device.

The inferred message is further shared by the step of sharing 105 a message illustrated in FIG. 1 on the network 207 shown in FIG. 2 and in FIG. 3.

Figure 5:
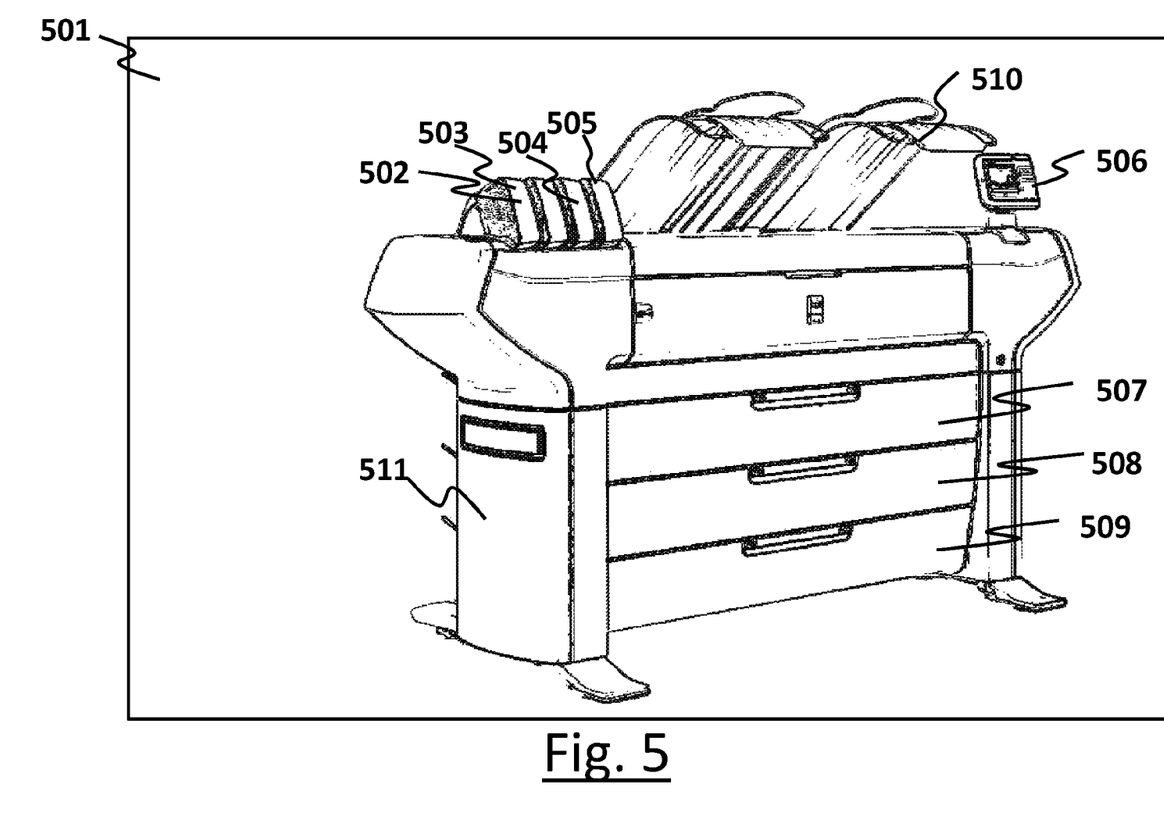
FIG. 5 illustrates an initial target view.

FIG. 5 shows an initial embodiment of a target view 501 displayed on a target display of a target device a printer and, by way of example, an Océ Colorwave 650. The target view 501 shows the printer having various components represented as widgets 502-511. According to the presented embodiment the printer components comprise loading media trays 507-509 for holding media rolls or precut media of different sizes and substrate, ink cartridges 502-505 for holding ink to be used for printing, media exit trays such as the top delivery tray 510 for delivering printed media, a display panel 506 showing the printer user interface and having buttons allowing a local user to manage the printer and, a printer controller compartment 511 where a printer controller hardware is located. Further, according to the presented embodiment, the printer components are shown without warnings since all trays are loaded with media, ink cartridges are not empty and the top delivery tray has space for receiving printed jobs. Further, according to the presented embodiment, the target view 501 is the result of the step of displaying 106 on the target display depicted in FIG. 1 and that will be further updated by the step of updating 109 shown in FIG. 1.

With regard to one aspect of the present invention, the target view 501 is different from the source view displayed on a source device; the difference being content related when the two views comprise widget representing at least one different source and target object and the difference being presentation related when the two views show different widgets referencing same objects using different representations, details and/or different user interface arrangements. For example, a source and a target device may show on their display different list of print jobs, the same list of print jobs using different levels of details arranged for different uses or different user interface arrangements. It shall be noted that, in a preferred embodiment the differences are content related.

Figure 6:
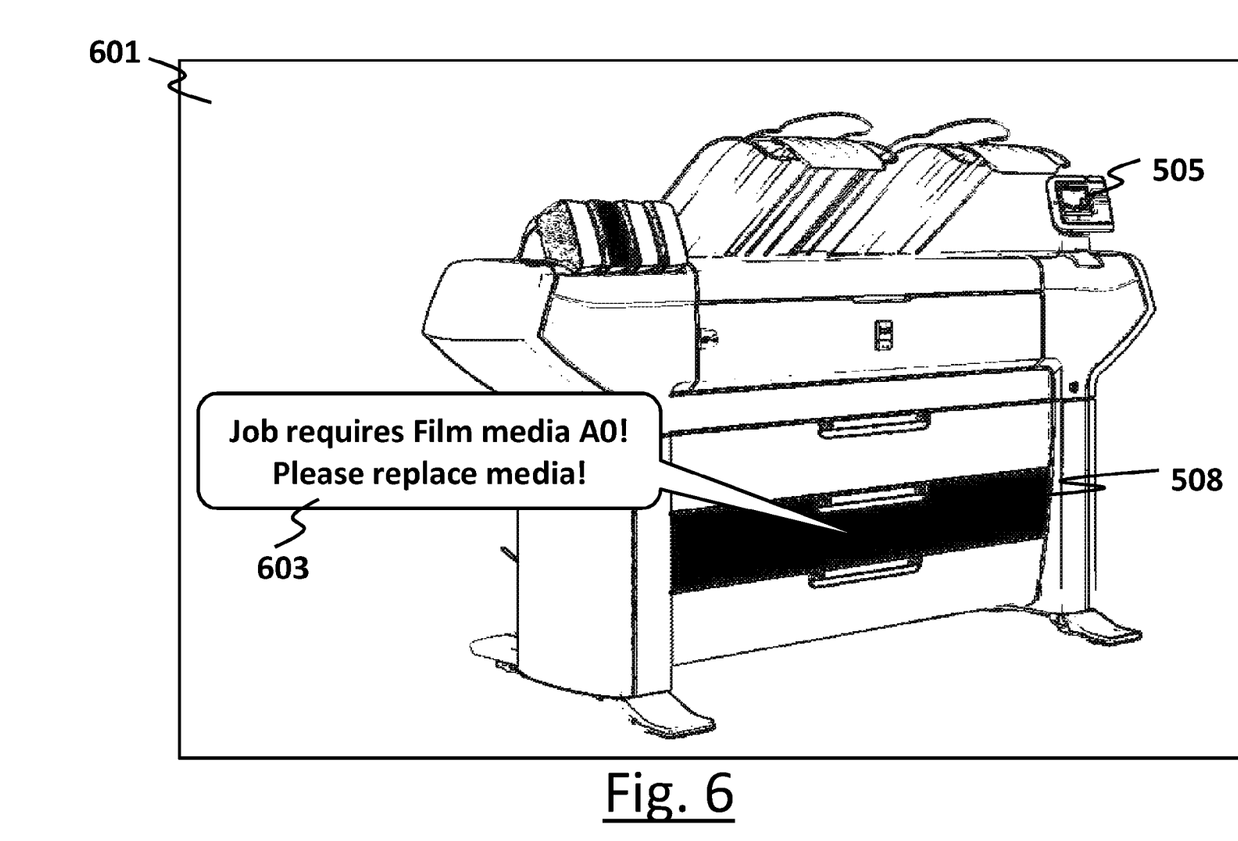
FIG. 6 illustrates a target view updated in accordance with the present invention.

FIG. 6 shows a target view 601 that is an updated embodiment of the target view 501 shown in FIG. 5 that was updated by the step of updating 109 shown in FIG. 1. Compared to the target view 501, the target view 601 shows the middle tray widget 508 and the magenta ink cartridge widget 503 as highlighted for user attention. Additional warning messages 602 and 603 providing details on the detected issues and possible corrective actions are further displayed as overplayed widgets 602 and 603 attached to the already highlighted widgets 503 and 508 and, in this particular case they provide textual information about the need for changing the magenta ink cartridge and the need for loading film media of ISO A0 size in the middle loading media tray 508 and that are required for printing of a particular print job that was selected in a source view of a source device. As it may be further noted, the target view 601 and the source view 101 from FIG. 4 are significantly different and show different widgets representing different source and target objects.

For clarity, according to the embodiments shown in FIG. 1, FIG. 4, FIG. 5 and FIG. 6 the method steps shown in FIG. 1 have the following effect: when a user 405 selects a print job shown as the widget 404, then a message referencing said selected print job is shared by the source device 101 and further read by a target device 102. The target device 102 initially showing the target view 501, upon reading the shared message comprising a reference to the selected print job, determines using the determining step 108 a number of relationships between the selected print job and the printer components shown as the widgets 502-511. As a consequence, determined components are further updated by the updating step 108 and, in this particular embodiment, the magenta ink widget 503 is highlighted since the ink level currently available is not sufficient for printing the totality of the selected print job and the middle loading media tray 508 is also highlighted since empty and available for receiving film media of ISO A0 size that is required for printing at least part of said print job and is not available from one of the other media trays. Further, the step of updating 108 adds the overlaid widgets 602 and 603 to the highlighted widgets 503 and 508 providing further details.

According to one key aspect of the present invention, the inference of a relationship between the reference or the at least part of the source object comprised in the message shared by the source device 101 and the target object represented by a widget on the target device 102 is realized by looking up said reference or part of the source object within a model stored for example in a database and also by evaluating predicates specific to the application. This inference is done by the step of determining 109 shown in FIG. 1. Further, when inferring the relationship the step of determining may consider the state of the target device as well as other information shared within the message and that represent additional hints. Therefore, although at a minimum the shared message comprises only a reference or at least part of the source object, in a preferred embodiment the shared message may comprise additional details such as the event type and the state of the source device.

For clarity and by way of example, when a user selects a print job on his mobile device, a message comprising the reference of a print job is received by the target device. Then it is determined that the target device shows on its display 506 an image 601 of the printer with its trays (FIG. 6) and that media assigned to tray 508 is needed for the print job selected by the user, which means that a message was received from the mobile device, the message containing a reference to the selected print job and this print job has a relationship with tray 508. Therefore, tray 508 is highlighted. As tray 508 is empty and is now highlighted a further help message widget 603 is shown attached providing further details to the user. A person skilled in the art of printing will notice that this embodiment is only an example and will understand that the intent of the present invention is to allow the joint use of both devices displays together and provide a better, more detailed and coherent view on the system.

Figure 7:
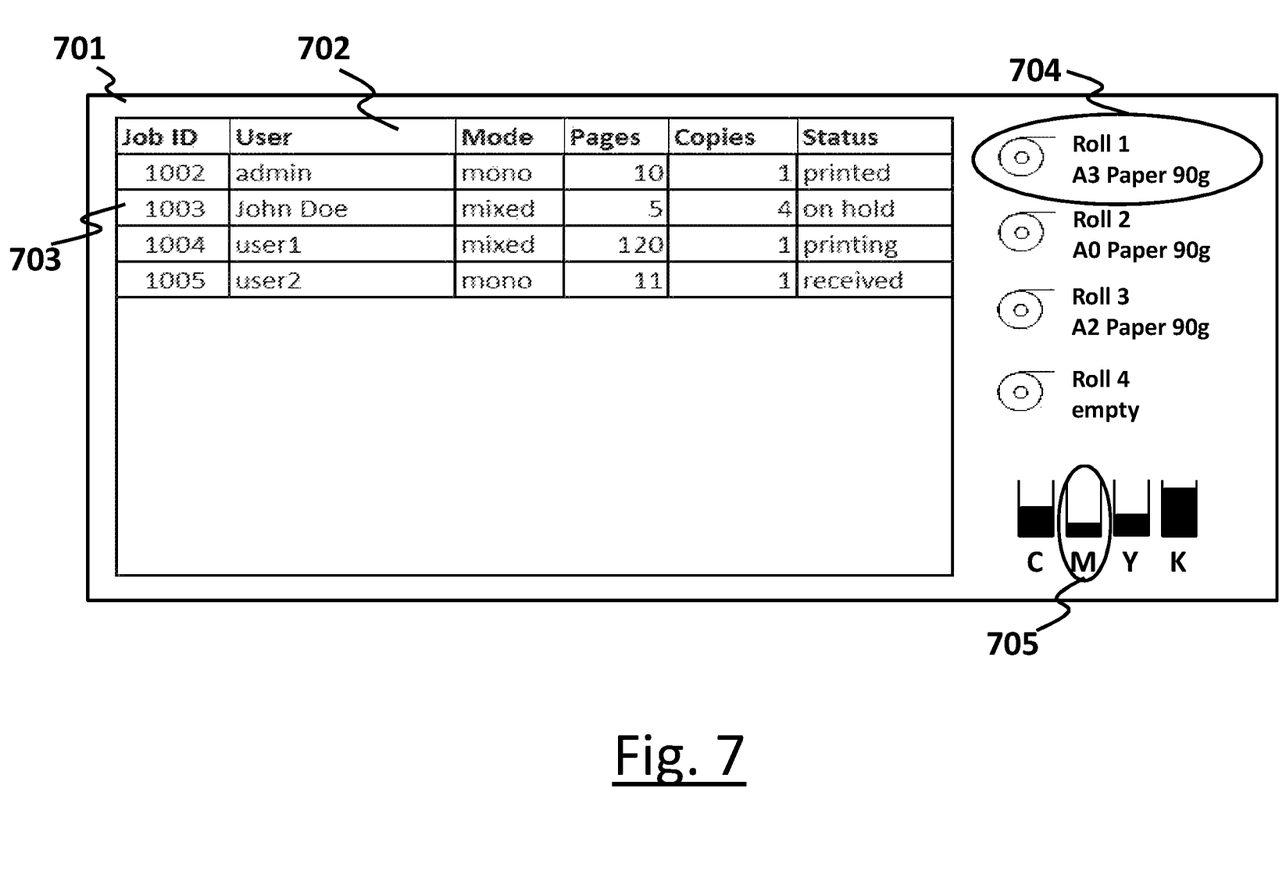
FIG. 7 shows a second example of an initial target view.

FIG. 7 depicts a further embodiment of a target view 701, and by way of example, the user interface of a printer management application shown on a printer panel. According to the depicted embodiment, the target view 701 comprises widgets representing a list of submitted print jobs 702 and a number of printer components having status. By way of example, the widget 703 represents a print job marked with the status "on hold" and the widget 704 represents the status of first loading media tray that is loaded with an ISO A3 roll of paper 90g. Further, the magenta ink tank widget 705 shows the ink level as being extremely low.

Figure 8:
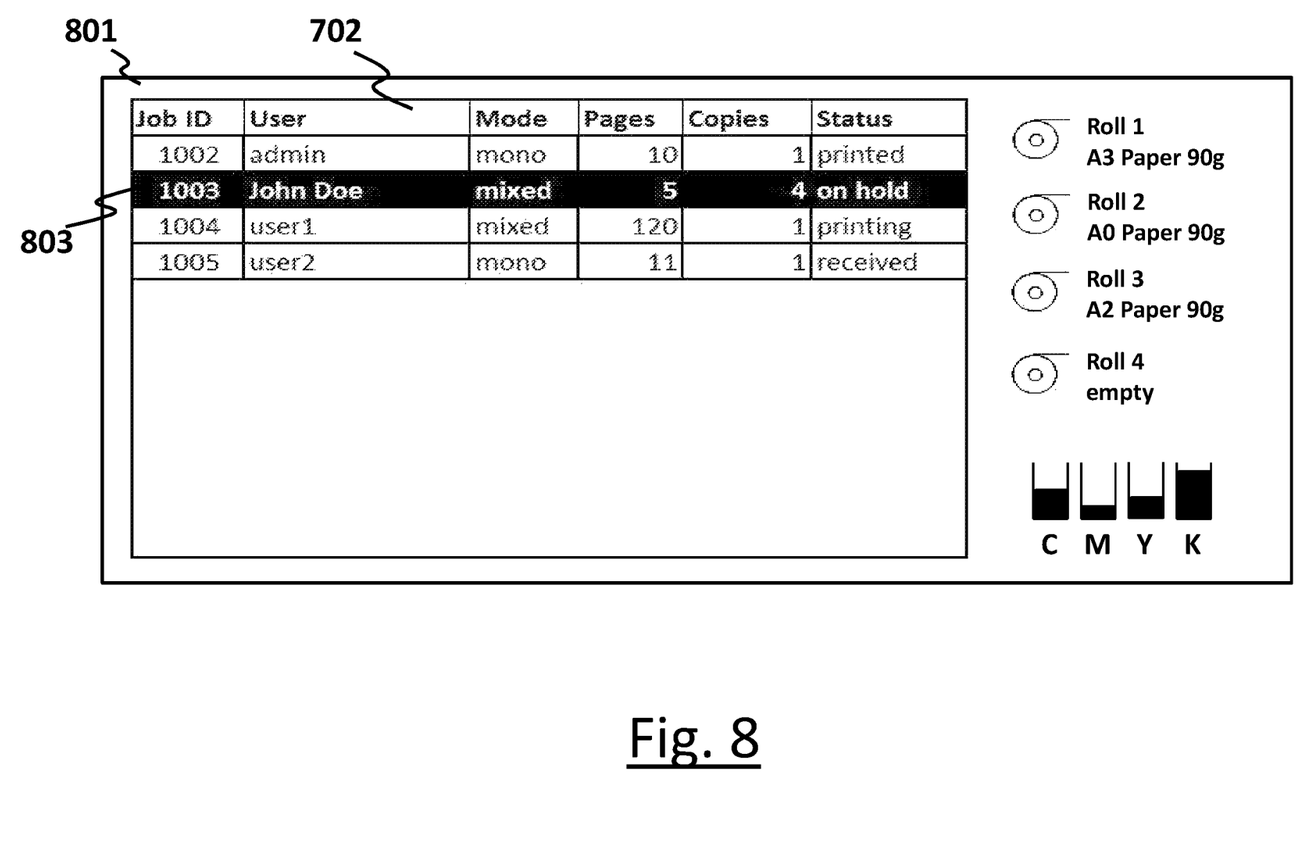
FIG. 8 shows the target view of FIG. 7, but now updated according to the invention.

By way of example, when a user having a tablet running a print application showing a source view selects a widget showing a nearby networked printer then, the printer may update (FIG. 8) its target view 701 to highlight the print jobs submitted by said user using the said mobile tablet as shown in the target view 801 so that the user can easily see his jobs in the queue. The updated target view 801 shows an updated target widget 803 that is obtained by updating the target view 701 shown in FIG. 7 by the step of updating 109 from FIG. 1 upon receiving a message from a source device and determining that the widget 703 from FIG. 7 needs to be highlighted since there is a determined relation between the information in the message read and the print job with ID 1003 that is the printable object represented by the widget 703 in FIG. 7.

Figure 9:
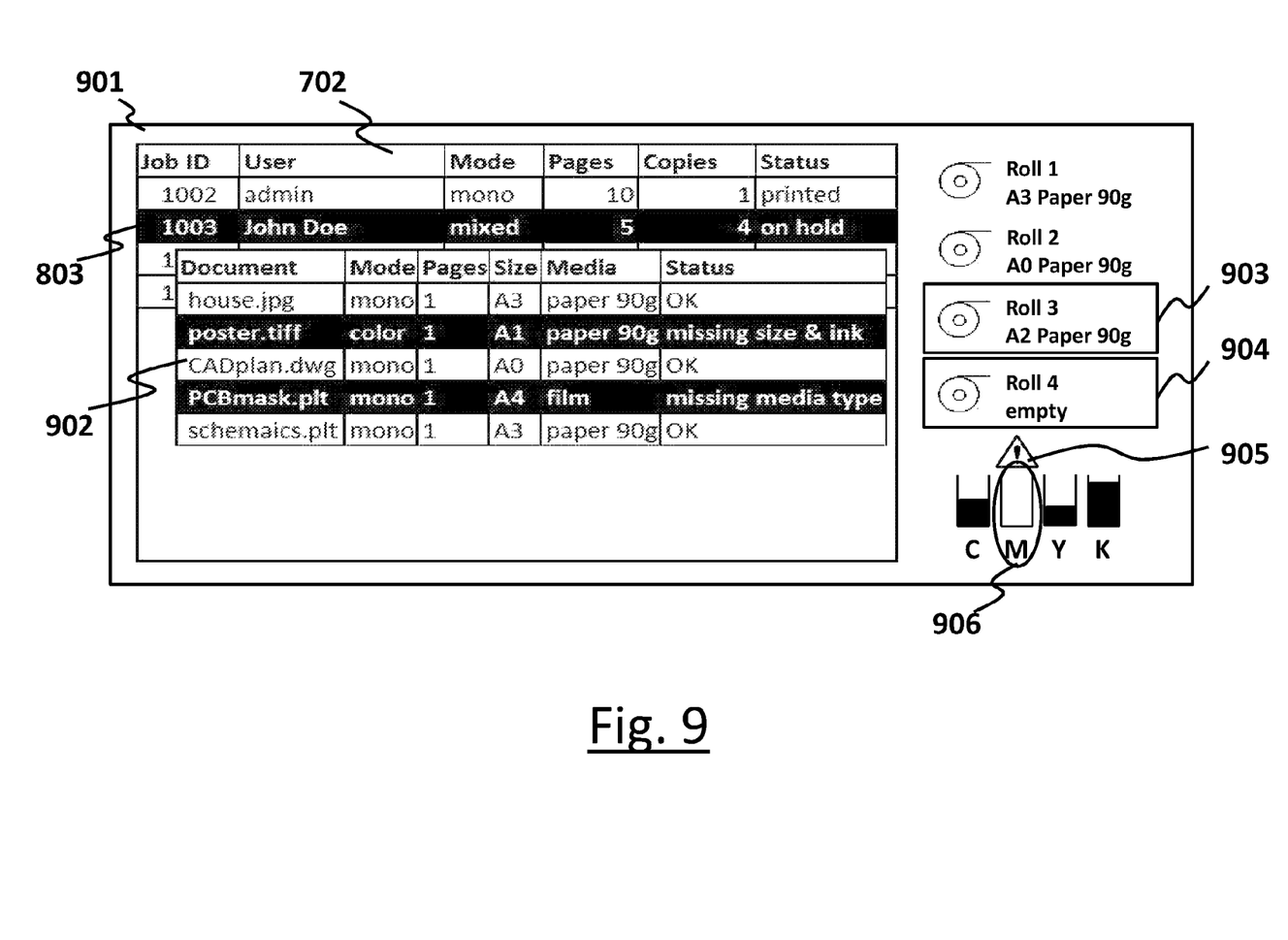
FIG. 9 shows an updated target view being a more preferred alternative to the updated target view of FIG. 8.

FIG. 9 shows a more preferred embodiment of an updated target view 901 that is an updated version of the target view 701 from FIG. 7. According to the drawing and additionally to the embodiment shown in FIG. 8, a new job details widget 902 is shown as an overlay attached to the highlighted print job widget 801 and shows details about printing issues with the print job. For clarity, the widget 902 shows the list of documents that are part of the print job having the ID 1003 that is highlighted for attention using the widget 803. The widget 902 shows as highlighted the documents having printing issues and provides a status information signaling that, for a document the required printing media is missing and that for another document the required media size is missing and the ink supply will be missing. Additionally, the printer status widgets 903 and 904 are highlighted showing that the user can load required media type and size on the third and fourth rolls represented by the widgets 903 and 904. Further, the magenta ink widget 705 shown in FIG. 7 is overlaid by the widget 906 showing that the magenta ink will be consumed during the printing of the print job and thus it needs to be refilled before.

The invention claimed is:

1. An automatic method for visualizing contextual relationships in a networked system comprising a source device having a source display and a target device having a target display, the method comprising the steps of:

displaying on the source display a source view comprising a source widget, the source widget representing a source object that is one of:
a printable object,
a reprographic device or component thereof, and
a property or status of any of the above;
detecting a user interaction event with regard to the source widget;
sharing a message to a network upon detecting the user interaction event, the shared message comprising a reference to or at least part of the source object represented by said source widget;
reading by the target device the shared message;
displaying on the target display a target view comprising a target widget, the target view being different from the source view, the target widget representing a target object, the target object being different from the source object, and the target object being one of:
a printable object,
a reprographic device or component thereof, and
a property or status of any of the above;
determining whether the target view and/or the target widget are contextually related to the source object by looking-up in a storage the reference or the at least part of the source object from the shared message and determining the existence of a relationship with the target object; and
updating the target view and/or the target widget by changing the visual appearance if a relationship has been determined.

2. The method according to claim 1, wherein the user interaction event is a selection event, a deselection event, a focus change event, or a touch event.

3. The method according to claim 2, wherein changing the visual appearance comprises highlighting at least part of said target view and/or said target widget.

4. The method according to claim 3, wherein the shared message also comprises the user interaction event and where the determining step takes into account the user interaction event.

5. The method according to claim 2, wherein changing the visual appearance comprises overlaying an overlay widget over said target view and/or target widget.

6. The method according to claim 1, wherein changing the visual appearance comprises highlighting at least part of said target view and/or said target widget.

7. The method according to claim 6, wherein changing the visual appearance comprises overlaying an overlay widget over said target view and/or target widget.

8. The method according to claim 6, wherein the shared message also comprises the user interaction event and where the determining step takes into account the user interaction event.

9. The method according to claim 1, wherein changing the visual appearance comprises overlaying an overlay widget over said target view and/or target widget.

10. The method according to claim 9, wherein said overlay widget represents the source object, the target object, a combination of the two, or an object that can be inferred from the relationship between the source object and the target object.

11. The method according to claim 1, wherein the shared message also comprises the user interaction event and where the determining step takes into account the user interaction event.

12. The method according to claim 1, wherein the source device or the target device is one of: a mobile phone, a tablet, a slate, a laptop, a computer, and a reprographic device.

13. A networked system for visualizing contextual relationships, said system comprising:
- a source device comprising communication means, the source device further comprising:
- a source display for displaying a source view comprising a source widget, the source widget representing a source object that is one of:
  - a printable object,
  - a reprographic device or component thereof, and
  - a property or status of any of the above;
- means for detecting a user interaction event with regard to the source widget; and
- means for sharing a first message to a network upon detecting said user interaction event, the first message comprising a reference to or at least part of the source object represented by said source widget; and
- a target device comprising communication means, the target device further comprising:
- means for reading the shared message comprising a reference to or at least part of a message object, the shared message being the first message and the message object being the source object, the message object being one of:
  - a printable object,
  - a reprographic device or component thereof, and
  - a property or status of any of the above;
- a target display for displaying a target view comprising a target widget, the target widget representing a target object, the target object being different from the message object, the target object being one of:
  - a printable object,
  - a reprographic device or component thereof, and
  - a property or status of any of the above;
- means for determining whether the target view and/or the target widget are contextually related to the message object by looking-up in a storage the reference or the at least part of the message object and determining the existence of a relationship with the target object; and
- means for updating the target view and/or the target widget by changing the visual appearance if a relationship has been determined by the means for determining.

14. The system according to claim 13, wherein the user interaction event is a selection event, a deselection event, a focus change event, or a touch event.

15. The system according to claim 13, wherein changing the visual appearance comprises highlighting at least part of said target view and/or said target widget.

16. The system according to claim 13, wherein changing the visual appearance comprises overlaying an overlay widget over said target view and/or target widget.

17. The system according to claim 16, wherein said overlay widget represents at least part of the message object, the target object, a combination of the two, or an object that can be inferred from the relationship between the message object and the target object.

18. The system according to claim 8, wherein the shared message further specifies the user interaction event, and wherein the determining means take into account the user interaction event.

19. The system according to claim 13, wherein the source device or the target device is one of: a mobile phone, a tablet, a slate, a laptop, a computer, and a reprographic device.

20. A target device comprising communication means, the target device further comprising:
- means for reading a shared message from a network comprising a reference to or at least part of a message object, the shared message being shared by a source device to the network and the message object being a source object represented by a source widget in a source view displayed on a source display of the source device, the message object being one of:
  - a printable object,
  - a reprographic device or component thereof, and
  - a property or status of any of the above;
- a target display for displaying a target view comprising a target widget, the target widget representing a target object, the target object being different from the message object, the target object being one of:
  - a printable object,
  - a reprographic device or component thereof, and
  - a property or status of any of the above;
- means for determining whether the target view and/or the target widget are contextually related to the message object by looking-up in a storage the reference or the at least part of the message object and determining the existence of a relationship with the target object; and
- means for updating the target view and/or the target widget by changing the visual appearance if the relationship has been determined by the means for determining.

* * * * *